United States Patent [19]
Kain

[11] B 3,924,898

[45] Dec. 9, 1975

[54] PROTECTIVE HUB CAP FOR BICYCLES

[76] Inventor: Calvin L. Kain, 1325 Rockdale Road, Bartlesville, Okla. 74003

[22] Filed: Oct. 1, 1973

[21] Appl. No.: 401,992

[44] Published under the Trial Voluntary Protest Program on January 28, 1975 as document no. B 401,992.

[52] U.S. Cl...... 301/108 SC; 301/37 R; 301/37 CM
[51] Int. Cl.² ........................................ B60B 27/00
[58] Field of Search......... 301/37 R, 37 CM, 37 TP, 301/37 S, 108 S, 108 SC, 108 A, 108 R, 105 B, 37 P, 9 DN; 280/289; 403/259; 85/52

[56] References Cited
UNITED STATES PATENTS 2,789,834   4/1957   Chism .................................. 280/489

3,356,421   12/1967   Trevarrow, Jr. .................... 301/37 S

FOREIGN PATENTS OR APPLICATIONS 17,888   1906   United Kingdom................. 403/259

*Primary Examiner*—Evon C. Blunk
*Assistant Examiner*—Victor N. Sakran
*Attorney, Agent, or Firm*—James H. Chafin

[57] ABSTRACT

A decorative hub cap for bicycles which serves as a side reflector and for protection of the exposed end of the bicycle wheel axle from scrapes and dents while protecting the rider thereof from leg injury due to the exposed axle end.

5 Claims, 3 Drawing Figures

PROTECTIVE HUB CAP FOR BICYCLES

BACKGROUND OF THE INVENTION

1. Field of the Invention

This invention relates to bicycle accessories and more particularly, but not by way of limitation, to a bicycle reflective hub cap which is particularly designed and constructed to provide protection for the wheel axle and for the rider thereof.

2. Description of the Prior Art

Since the renewed interest in bicycling as a form of exercise and transportation, more and more bicyles are found on the highways and streets which creates a hazard from motorists. Therefore, it is imperative that the bicycle be provided with adequate reflectors and bright objects so that motorists will not have trouble spotting the bicycle rider.

The present design utilized on bicycle wheels results in the threaded end of the bicycle wheel axles to be exposed thereby creating a hazard for the bicycle rider and for persons in the near proximity of the bicycle. If a person brushes his leg against the exposed threaded axle, it usually results in torn trousers or injury to the person's leg. Further, if the rider accidentally rides too close to some obstacle and catches the axle end thereon or bumps the said axle end it many times results in damage to the exposed axle threads and may render the axle unservable without rethreading.

Presently, the only axle protection provided by the manufacturer amounts to small plastic snap-on covers which are quickly lost or become loose after the bicycle is put into use.

SUMMARY OF THE INVENTION

The present invention provides a novel bicycle hub cap which is particularly designed and constructed to overcome the above disadvantages while adding to the aesthetic appearance of the bicycle.

The hub cap comprises a plastic protection device having an S-shaped radial cross sectional configuration which is positively secured to the bicycle wheel axle and at the same time provides ample protection for the rider and the exposed axle end. A specially constructed metal washer insert is disposed in the center of the hub cap which provides for metal to metal tightening of the axle nut thereby allowing the use of any suitable material for the construction of the hub cap itself.

The outside surface of the hub cap may be painted fluorescent or otherwise constructed of a reflective material for additional safety from motorists, while the positive attachment feature makes it extremely difficult for the hub cap to be stolen or inadvertently lost from the bicycle during use.

DESCRIPTION OF THE DRAWINGS

Other and further advantageous features of the present invention will hereinafter more fully appear in connection with a detailed description of the drawings in which.

DETAILED DESCRIPTION OF THE PREFERRED EMBODIMENT

Figure 3:
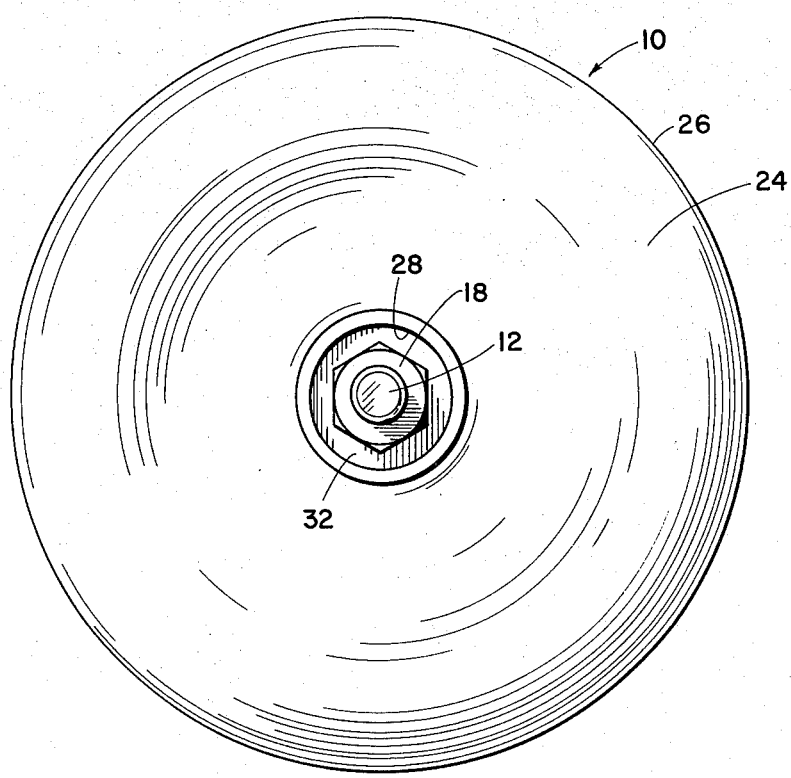
FIG. 3 is a side elevational view of the hub cap of FIG. 2.
Figure 2:
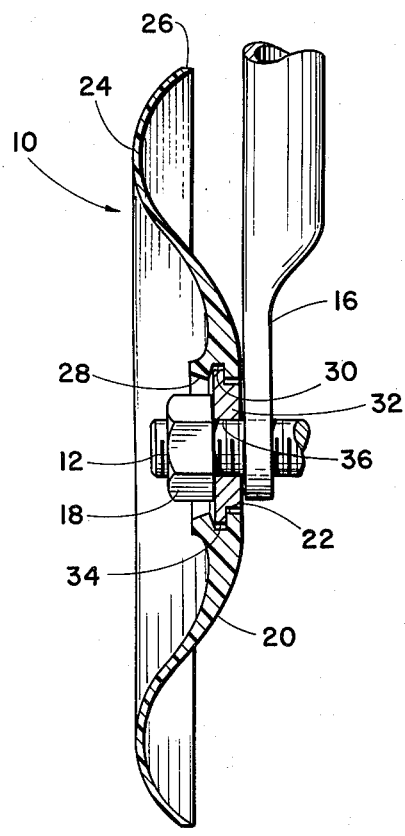
FIG. 2 is a front elevational sectional view depicting the hub cap shape and attachment means.
Figure 1:
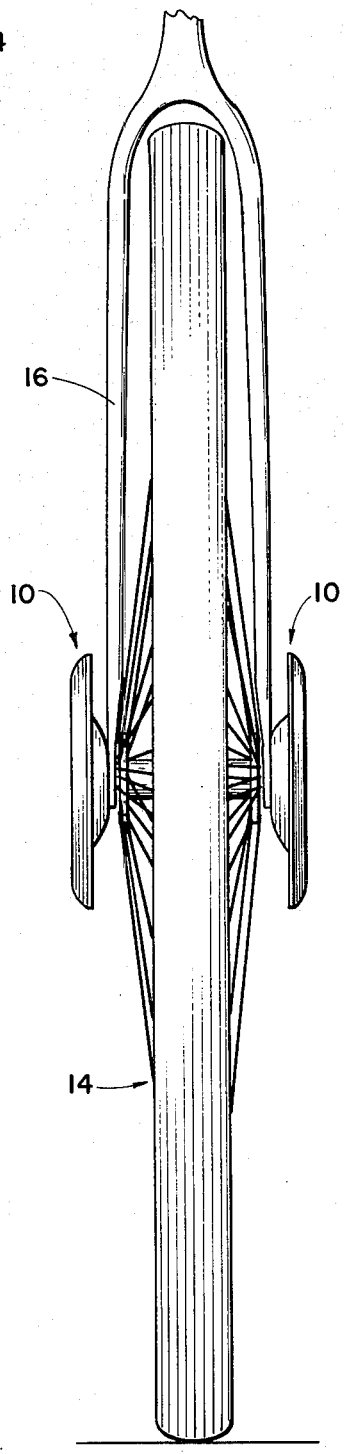
FIG. 1 is a front elevational view of a bicycle wheel equipped with a pair of hub caps embodying the invention.

Referring to the drawings in detail, reference character 10 generally indicates a hub cap which is attached to the threaded axle 12 of a bicycle wheel generally indicated by reference character 14. The bicycle wheel 14 is held in place in relation to the bicycle frame (not shown) by means of a bicycle fork member 16 which has two prongs for each wheel which extend down on each side of the wheel and are secured around the axle member 12. Normally, these forks are held in place on either side of the bicycle wheel by means of an outer axle nut 18.

Normally, the bicycle nut 18 is tightened directly against the lower end of the fork member 16 which leaves the outer end of the said axle 12 exposed which can result in damage to the outer end of the axle or personal injury to the rider or someone in the near proximity thereof.

The bicycle hub 10 comprises a substantially circular shaped hub member 20 having a centrally disposed aperture 22 therethrough. The hub 20 is configured to have a substantially S-shaped radial design wherein the outer portion thereof indicated by reference character 24 protrudes outwardly from the bicycle wheel 14 to a point beyond the end of the threaded axle 12. The extreme outer edge 26 of the hub member 20 is provided with a reverse curve inwardly toward the wheel itself.

An annular shaped groove is provided in the aperture 22 for receiving a washer therein. The outer end of the aperture 22 is provided with a flared recess 28 which extends from the outer face thereof inwardly toward the annularly shaped groove 30 for a purpose that will be hereinafter set forth.

A cylindrical shaped washer member 32 having an outside diameter substantially equal to the inside diameter of the aperture 22 is provided with an outwardly extending flange member 34 around one end thereof. The flange member 34 has an outside diameter substantially equal to the inside diameter of the annular shaped groove 30 within the aperture 22. The distance between the flange 34 and the opposite end of the washer member 32 is substantially equal to the distance between the annular shaped groove 30 and the inside face of the hub member 20. The said washer may be snapped into place within the aperture 22 by inserting the small end of the washer inwardly from the outside past the annular groove 30. The flange member 34 of the washer is then pressed downwardly through the flared portion 28 of the aperture 22 until the said flange member snaps into the annular shaped groove 30 thereby locking the washer in place within the hub member 20. The washer is provided with a centrally disposed aperture therein which is sized to fit the standard axle 12 so that the washer and hub attached thereto may be slipped onto the bicycle axle and tightened into place by means of the nut 18.

It is noted that various bicycles have different sized wheel axles and this may be compensated for by either providing snap in washers having different sized centrally disposed apertures 36 therein or by providing a single washer member 32 having a knock out portion (not shown) therein for fitting the said washer to the various sized bicycle wheel axles. The metal washer member 32 provides a metal-to-metal tightening surface for the nut 18 to be tightened against. Once the nut is in place it is positively locked into place and cannot be shaken loose by ordinary vibration and bumping thereof.

Naturally, the outer surface of the hub 20 may be finished with a fluorescent paint or may be constructed of a material which either glows in the dark or is reflective. It is also noted that the center portion of the hub member 20 is constructed to be thicker than the material around the outer periphery thereof which will allow a spring action of the hub member itself while still providing a sufficient thickness for strength around the aperture 22 and the washer 32 disposed therein.

From the foregoing, it is readily apparent that the present invention provides a novel hub cap for bicycles which serves to protect the exposed ends of the wheel axle from damage and also to protect the bicycle rider from inadvertent leg injuries due to scraping thereagainst. The present invention further provides added reflective surface and visibility for motorists.

Whereas the present invention has been described in particular relation to the drawings attached hereto, other and further modifications apart from those shown or suggested herein may be made within the spirit and scope of this invention.

What is claimed is:

1. A hub cap for bicycle wheel axles comprising a circular hub member having a substantially S-shaped radial cross sectional configuration, said hub member being provided with a centrally disposed aperture therein, an axle attachment washer disposed within said aperture and slidably disposed on the wheel axle, and means for removably securing the washer to the hub member, and wherein the outer portion of the hub member extends outwardly away from the wheel to a point beyond the end of the wheel axle and wherein the outer edge of said hub member curves back towards the wheel thereby forming an annular protective surface around the end of the wheel axle.

2. A hub cap for bicycle wheel axles as set forth in claim 1 wherein the center portion of the hub member is constructed of a thicker material than the outer portion thereof.

3. A hub cap for bicycle wheel axles as set forth in claim 1 wherein the material for the hub member is reflective.

4. A hub cap for bicycle wheel axles as set forth in claim 1 wherein the outer surface of the hub member is fluorescent.

5. A hub cap for bicycle wheel axles comprising a circular hub member having a substantially S-shaped radial cross sectional configuration, said hub member being provided with a centrally disposed aperture therein, an axle attachment washer disposed within said aperture and slidably disposed on the wheel axle, and means for removably securing the washer to the hub member, and wherein the outer portion of the hub member extends outwardly away from the wheel to a point beyond the end of the wheel axle and wherein the outer edge of said hub member curves back towards the wheel thereby forming an annular protective surface around the end of the wheel axle, and wherein the washer is cylindrical in shape and is provided with an outwardly extending flange therearound and wherein the means for removably securing the washer to the hub member comprises an annular groove disposed within the hub member aperture, a flared recess provided in the outer end of the aperture between the outer face of the hub member and the groove, the diameter of the cylindrical washer is substantially equal to the diameter of the aperture and the diameter of the flange is substantially equal to the diameter of the groove whereby the cylindrical washer is inserted into the aperture and the flange is passed through the flared recess and snapped into the groove within the aperture.

* * * * *